United States Patent [19]
Williams et al.

[11] Patent Number: 5,233,375
[45] Date of Patent: Aug. 3, 1993

[54] LOGO PROJECTOR

[76] Inventors: Charles A. Williams, 1422 3rd Ave., #3D; Stephen L. Heiden, 1422 3rd Ave., Apt. #3-B, both of New York, N.Y. 10028-1834

[21] Appl. No.: 734,674

[22] Filed: Jul. 29, 1991

[51] Int. Cl.⁵ ............................................ G03B 21/00
[52] U.S. Cl. ..................................................... 353/43
[58] Field of Search .................... 353/43, 100, 80, 24, 353/23, 22

[56]       References Cited
       U.S. PATENT DOCUMENTS
   2,090,086  8/1937  Weiner .
   2,478,336  8/1949  Stein .
   2,553,100  5/1951  Lynch .
   2,764,058  9/1956  Ellis .
   3,078,761  2/1963  Zorn .
   3,183,773  5/1965  Weinstein .
   3,401,596  9/1968  Hirsch .
   3,539,798 11/1970  Perry .

FOREIGN PATENT DOCUMENTS
0227502  1/1925  United Kingdom .

Primary Examiner—William A. Cuchlinski, Jr.
Assistant Examiner—William C. Dowling
Attorney, Agent, or Firm—Richard L. Miller

[57]            ABSTRACT

A logo projector is provided which consists of a flashlight that can be held in a hand of a person using said logo projector. A bezel is affixed to the flashlight so that when the flashlight is turned on a beam of light will pass through the bezel. An elongated opaque tube is affixed at a first end to the bezel. A focusing lens is affixed to a second end of the elongated opaque tube. A transparent member having an opaque logo on the center of the back surface thereof is also provided. The transparent member is affixed to the first end of the elongated opaque tube adjacent the bezel so that when the flashlight is turned on the beam of light passing through will cause an image of a silhouette of the opaque logo from the transparent member to be projected onto a distant surface.

6 Claims, 1 Drawing Sheet

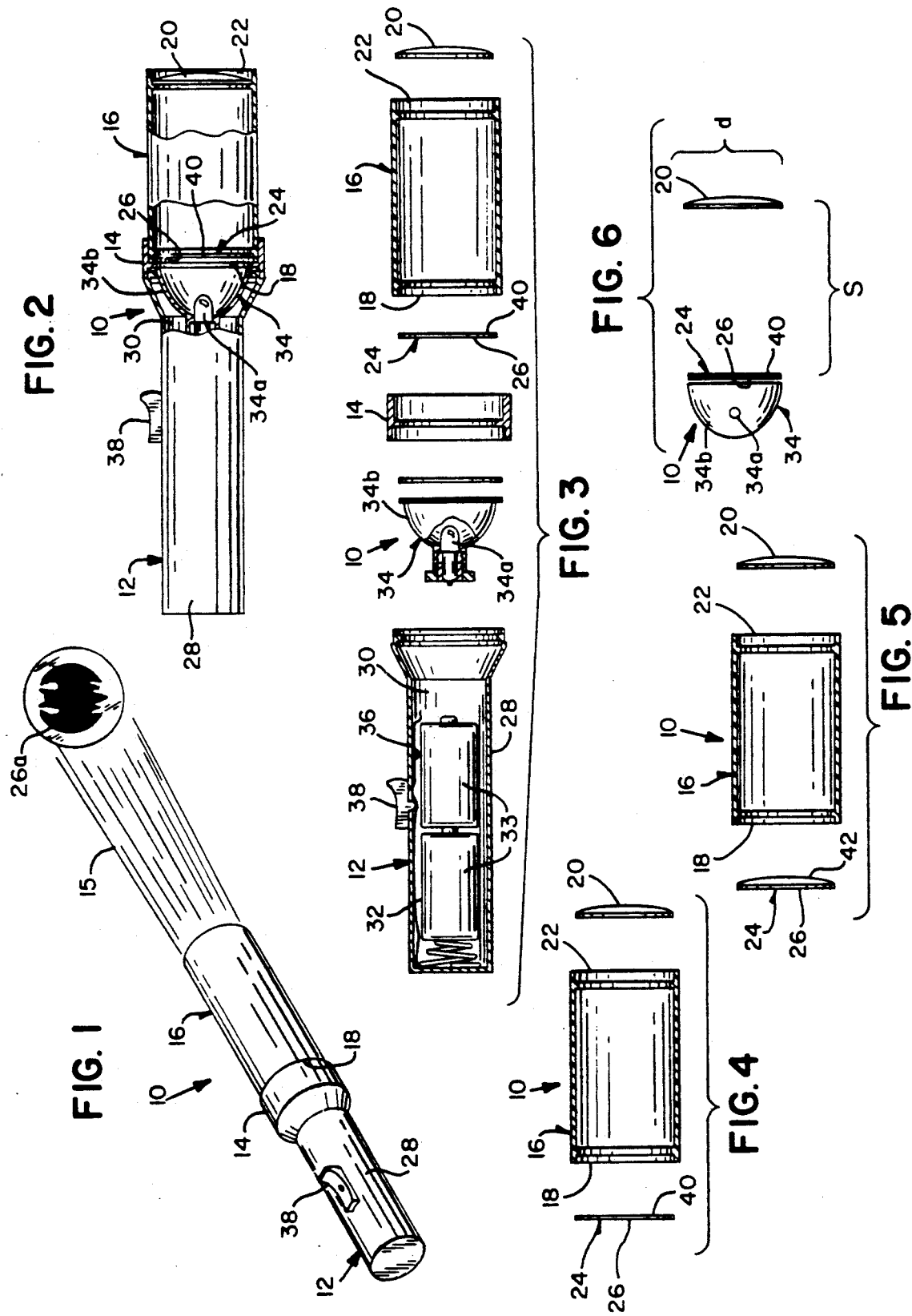

LOGO PROJECTOR

BACKGROUND OF THE INVENTION

The instant invention relates generally to hand held transparency projectors and more specifically it relates to a logo projector.

Numerous hand held transparency projectors have been provided in the prior art that are adapted to project images from film strips by battery operated light sources through lens systems. For example, U.S. Pat. Nos. 3,756,710 to Taylor; 4,396,262 to Laizans et al. and Des. 264,344 to Miller et al all are illustrative of such prior art. While these units may be suitable for the particular purpose to which they address, they would not be as suitable for the purpose of the present invention as hereafter described.

SUMMARY OF THE INVENTION

A primary object of the present invention is to provide a logo projector that will overcome the shortcomings of the prior art devices.

Another object is to provide a logo projector that is like combining a flashlight and a telescope together, which will cause a silhouette of an opaque logo to be properly projected upon a distant surface by a beam of light emitted from the flashlight.

An additional object is to provide a logo projector that will project the silhouette image of the opaque logo onto a distant surface in a near perfect focus, without having to reposition a focusing lens mounted on the end of the telescope portion.

A further object is to provide a logo projector that is simple and easy to use.

A still further object is to provide a logo projector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view illustrating the instant invention in use;

FIG. 2 is a plan view partially cut away illustrating the internal construction thereof;

FIG. 3 is an exploded view thereof;

FIG. 4 is a diagrammatic view of a first embodiment of a lens system that may be incorporated in the instant invention;

FIG. 5 is a diagrammatic view of a second alternate embodiment of a lens system that may be incorporated in the instant invention; and FIG. 6 is a diagrammatic view illustrating the relationship between the lens diameter d, the distance between the lens and mask s and the focal length f.

DETAILED DESCRIPTION OF THE PREFERRED EMBODIMENTS

Turning now descriptively to the drawings, in which similar reference characters denote similar elements throughout the several views, the Figures illustrate a logo projector 10 which consists of a flashlight 12 that can be held in a hand of a person using the logo projector 10. A bezel 14 is affixed to the flashlight 12 so that when the flashlight 12 is turned on a beam of light 15 will pass through the bezel 14. An elongated opaque tube 16 is affixed at a first end 18 to the bezel 14. A focusing lens 20 is affixed to a second end 22 of the elongated opaque tube 16. A transparent member 24 is also provided having an opaque logo 26 on the center of the back surface thereof. The transparent member 24 is affixed to the first end 18 of the elongated opaque tube 16 adjacent the bezel 24. When the flashlight 12 is turned on the beam of light 15 passing through will cause an image of a silhouette of the opaque logo 26a from said transparent member 24 to be projected onto a distant surface.

The flashlight 12 includes a housing 28 having a chamber 30. A power supply 32, having as at least one battery, but illustrated typically with two batteries 33, is positioned within the chamber 30 of the housing 28. A light source 34, typically a light bulb 34a in a parabolic reflector 34b is positioned within the chamber 30 of the housing 28 between the power supply 32 and the bezel 14. A flexible conductor 36 is for electrically connecting the power supply 32 to the light source 34. The flexible conductor 36 is biased so as to provide a normally opened circuit. A button 38 mounted to slide on the housing 38, is movable between a first and second position. The button 38 depresses the flexible conductor 36 in the first position in order to close the circuit, and releases the flexible conductor 36 in the second position in order to open the circuit. The button 38 will turn on the light source 34 in the first position and turn off the light source 34 in the second position.

The transparent member 24, as shown in FIGS. 2, 3, 4 and 6 is a flat disc 40 sized to securely fit against the first end 18 of the elongated opaque tube 16. The transparent member has a silhouette opaque logo 26 imprinted thereon and is typically illustrated as a a bat 26a best seen in FIG. 1. For best results as illustrated in FIG. 6, the distance S should be as follows:

$$300 \times f/(300-f) < S < 180 \times f/(180-f),$$

where
- f is the focal length in inches of the focusing lens 20;
- S is the distance in inches between the logo 26 and the focusing lens 20; and
- d is the same diameter of both the focusing lens 20, and parabolic reflector 34b.

In a second embodiment, the transparent member 24, as shown in FIG. 5, is a second lens 42 having a plano-convex configuration and sized to securely fit against the first end 18 of the elongated opaque tube 16, so as to give a better saturation of light surrounding the image of the silhouette of the opaque logo 26a when projected onto the distant surface.

To use the logo projector 10, a person simply grips the housing 28 of the flashlight 12, by the hand and slides the button 38 with the thumb. This turns on the flashlight 12 so that the beam of light 15 will pass through the bezel 14, the transparent member 24 with the opaque logo 26 and the focusing lens 20 to project the image of a silhouette of the opaque logo 26 onto the distant surface in good focus from about five feet to infinity, without changing the position of the focusing lens 20. The opaque logo 26 should always be placed at the center of the transparent member 24 to compensate for diffused light coming from the light source 34 because the light is not coming from a true point.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An opaque logo projector which comprises:
   a) a flashlight having a housing that can be held in a hand of a person using said opaque logo projector;
   b) a light source with a parabolic reflector mounted at a front end of the housing;
   c) a bezel affixed to said front end of said housing so that when said flashlight is turned on a beam of light will pass through said bezel;
   d) an elongated open tube of constant length affixed at a first end to said bezel;
   e) a focusing lens affixed to a second end of said elongated opaque tube, wherein said focusing lens has a focal length equal to f, and the distance S between said opaque logo and said focusing lens is greater than $300 \times f/(300-f)$, but less than $180 \times f/(180-f)$; and
   f) a transparent member having an opaque logo on the center of the back surface thereof, said transparent member affixed to the first end of said elongated opaque tube adjacent said bezel so that when said flashlight is turned on the beam of light passing through will cause an image of a silhouette of the opaque logo from said transparent member to be projected onto a distant surface.

2. A logo projector as recited in claim 1, wherein said transparent member is a flat disc sized to securely fit against the first end of said elongated opaque tube.

3. A logo projector as recited in claim 1, wherein said transparent member is a second lens having a plano-convex configuration and sized to securely fit against the first end of said elongated opaque tube, so as to give a better saturation of light surrounding the image of the silhouette of the opaque logo when projected onto the distant surface.

4. A logo projector as recited in claim 1, wherein said said parabolic reflector and said focusing lens have a same diameter.

5. A logo projector which comprises:
   a) a flashlight that can be held in a hand of a person using said logo projector;
   b) a bezel affixed to said flashlight so that when said flashlight is turned on a beam of light will pass through said bezel;
   c) an elongated opaque tube of constant length affixed at a first end to said bezel;
   d) a focusing lens affixed to a second end of said elongated opaque tube, wherein said focusing lens has a focal length equal to f, and the distance S between said opaque logo and said focusing lens is greater than $300 \times f/(300-f)$, but less than $180 \times f/(180-f)$;
   e) a transparent member having an opaque logo on the center of the back surface thereof, said transparent member affixed to the first end of said elongated opaque tube adjacent said bezel so that when said flashlight is turned on the beam of light passing through will cause an image of a silhouette of the opaque logo from said transparent member to be projected onto a distant surface, wherein said transparent member is a flat disc sized to securely fit against the first end of said elongated opaque tube;
   f) a housing having a chamber;
   g) a power supply positioned within the chamber of said housing;
   h) a light source having a parabolic reflector positioned within the chamber of said housing between said power supply and said bezel, wherein said said parabolic reflector and said focusing lens have a same diameter;
   i) a flexible conductor for electrically connecting said power supply to said light source, said flexible conductor biased so as to provide a normally opened circuit; and
   j) a button mounted to slide on said housing, movable between a first and second position, said button depresses said flexible conductor in the first position in order to close the circuit, and releases said flexible conductor in the second position in order to open the circuit, so that said button will turn on said light source in the first position and turn off said light source in the second position.

6. A logo projector which comprises:
   a) a flashlight that can be held in a hand of a person using said logo projector;
   b) a bezel affixed to said flashlight so that when said flashlight is turned on a beam of light will pass through said bezel;
   c) an elongated opaque tube affixed at a first end to said bezel;
   d) a focusing lens affixed to a second end of said elongated opaque tube, wherein said focusing lens has a focal length equal to f, and the distance S between said opaque logo and said focusing lens is greater than $300 \times f/(300-f)$, but less than $180 \times f/(180-f)$;
   e) a transparent member having an opaque logo on the center of the back surface thereof, said transparent member affixed to the first end of said elongated opaque tube adjacent said bezel so that when said flashlight is turned on the beam of light passing through will cause an image of a silhouette of the opaque logo from said transparent member to be projected onto a distant surface, wherein said transparent member is a second lens having a plano-convex configuration and sized to securely fit against the first end of said elongated opaque tube, so as to give a better saturation of light surrounding the image of the silhouette of the opaque logo when projected onto the distant surface;
   f) a housing having a chamber;
   g) a power supply positioned within the chamber of said housing;
   h) a light source having a parabolic reflector positioned within the chamber of said housing between said power supply and said bezel, wherein said said parabolic reflector and said focusing lens have a same diameter;
   i) a flexible conductor for electrically connecting said power supply to said light source, said flexible conductor biased so as to provide a normally opened circuit; and j) a button mounted to slide on said housing, movable between a first and second position, said button depresses said flexible conductor in the first position in order to close the circuit, and releases said flexible conductor in the second position in order to open the circuit, so that said button will turn on said light source in the first position and turn off said light source in the second position.

* * * * *